(12) United States Patent
Ramakesavan

(10) Patent No.: US 7,231,605 B1
(45) Date of Patent: Jun. 12, 2007

(54) METHOD AND APPARATUS FOR MAPPING ELECTRONIC DEVICES COUPLED TO A WIRELESS NETWORK

(75) Inventor: Sundaram Ramakesavan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/545,707

(22) Filed: Apr. 7, 2000

(51) Int. Cl.
*G06F 3/00* (2006.01)

(52) U.S. Cl. .................................................... 715/734

(58) Field of Classification Search ................ 345/734, 345/736, 853, 969; 715/733–740, 744, 747, 715/853, 859, 969, 751–759; 709/217–219, 709/204–207; 379/102.01, 102.02, 102.03, 379/102.07, 74, 185, 106.01, 93.21, 157–160, 379/202; 348/211.99–211.8, 211.13, 734, 348/14.01–14.16, 211.12; 455/3.01–3.06, 455/418, 420, 352–353

See application file for complete search history.

(56) References Cited

U.S. PATENT DOCUMENTS

| | | | | |
|---|---|---|---|---|
| 5,267,875 | A * | 12/1993 | Koegel et al. | 439/497 |
| 5,274,699 | A * | 12/1993 | Ranz | 379/142.09 |
| 5,410,326 | A * | 4/1995 | Goldstein | 340/825.72 |
| 5,923,327 | A * | 7/1999 | Smith et al. | 345/784 |
| 5,930,700 | A * | 7/1999 | Pepper et al. | 379/211.02 |
| 6,169,911 | B1 * | 1/2001 | Wagner et al. | 379/88.14 |
| 6,266,367 | B1 * | 7/2001 | Strait | 370/286 |
| 6,266,539 | B1 * | 7/2001 | Pardo | 379/93.05 |
| 6,807,562 | B1 * | 10/2004 | Pennock et al. | 709/204 |

FOREIGN PATENT DOCUMENTS

WO       WO 98/17032        4/1998

OTHER PUBLICATIONS

Bluetooth Specification Version 1.0B, Service Discovery Protocol, XP-002176975, Nov. 29, 1999, pp. 324-384.
PCT/US01/10384 Int'l Search Report dated Nov. 6, 2002.
PCT/US01/10384 Int'l Preliminary Examination Report dated May 21, 2003.
India Application No. IN/PCT/2002/01451/MUM 1st Examination Report dated Jan. 21, 2004.
Taiwan Application No. 090108291 Office Action dated Aug. 9, 2004.
Chinese Application No. 01810592.0 Office Action dated Aug. 30, 2004.
European Application No. 01 922 941.8—2416 communication dated Feb. 3, 2005.

* cited by examiner

*Primary Examiner*—Kristine Kincaid
*Assistant Examiner*—Lê Nguyen
(74) *Attorney, Agent, or Firm*—Blakely, Sokoloff, Taylor & Zafman LLP

(57) ABSTRACT

A user selects a wireless network mapping option on their computer and is presented with a list of names of electronic devices coupled to the wireless network to which the computer is coupled. When one of the electronic devices transmits a wireless identification signal to the computer, a visual cue identifies the default name associated with the electronic device in the list. The user may then rename the default name to a local name. The user may also opt to transmit a wireless identification signal of their own to one or more of the electronic devices coupled to the wireless network. Alternatively, the user may select one or more electronic devices from the list, and nudge the selected devices by sending an activation signal, causing the electronic devices to identify themselves using an audio or visual cue.

14 Claims, 5 Drawing Sheets

METHOD AND APPARATUS FOR MAPPING ELECTRONIC DEVICES COUPLED TO A WIRELESS NETWORK

The present invention relates to computer systems and more particularly to wireless communication between electronic devices to facilitate identification of the devices and association of the devices with default and local names.

BACKGROUND

Computer systems, from small handheld assistants to medium-sized mobile and desktop systems to large servers and workstations, are becoming increasingly pervasive in our society. Computer systems typically include one or more processors. A processor manipulates and controls the flow of data in a computer by executing instructions.

Currently, communication protocols are being developed to enable different types of computer systems to communicate with each other, allowing for a rapid exchange of data. Enabling this type of communication among computer systems may greatly enhance our efficiency. Unfortunately, establishing a communication link and exchanging data between computer systems may be a complex and time consuming task. In particular, communication links between computers that operate using different languages, or between unidentified computers, can be unintuitive, inefficient and may jeopardize system security.

The present invention addresses this and other problems associated with the prior art.

BRIEF DESCRIPTION OF THE DRAWINGS

The present invention is illustrated by way of example and not limitation in the accompanying figures in which like references indicate similar elements and in which.

DETAILED DESCRIPTION

In accordance with an embodiment of the present invention, a user selects a wireless network mapping option on their computer. Upon doing so, a display screen of the computer presents the user with a list of names of electronic devices coupled to the wireless network to which the computer is coupled. When one of the electronic devices coupled to the wireless network transmits a wireless identification signal to the computer, a visual cue identifies the default name associated with the electronic device in the list. The user may then rename the default name to a new local name that may be more intuitive to the user. Subsequently, when exchanging files or other data with the electronic device, the default name may be used to identify the electronic device.

The user may also opt for their computer system to transmit a wireless identification signal of its own to one or more of the electronic devices coupled to the wireless network. An alternate user of an electronic device that receives the identification signal from the computer system may similarly be notified of the default name associated with the computer system by a visual cue on a display screen of the electronic device. The alternate user may then rename the default name to a new local name for use in exchanging data with the computer system.

In accordance with another embodiment of the present invention, the user may select one or more electronic devices from the list of names of electronic devices coupled to the wireless network to which their computer is coupled. The user may then initiate the transmission of an activation signal to the selected device or devices. In response to this activation signal, a receiving device identifies itself using an audio or visual cue. The user, upon perceiving this cue, becomes apprised of which name in the list of electronic devices is associated with which electronic device, thereby aiding in the exchange of data with the electronic device. The user may also opt to rename the default name associated with the electronic device to a new local name that may be more intuitive to the user.

A more detailed description of embodiments of the present invention, including various configurations and implementations, is provided below.

As used herein, the term "electronic device" is used to broadly encompass not only computer systems but also their peripherals. For example, an electronic device may be a mobile computer system (e.g. a notebook or laptop computer system), a handheld device (e.g. a personal data assistant (PDA), cell phone, or other electronic information manager), or a desktop, workstation or server system. An electronic device may also be a printer, modem, or network access port (such as a local area network (LAN) access port).

Figure 1:
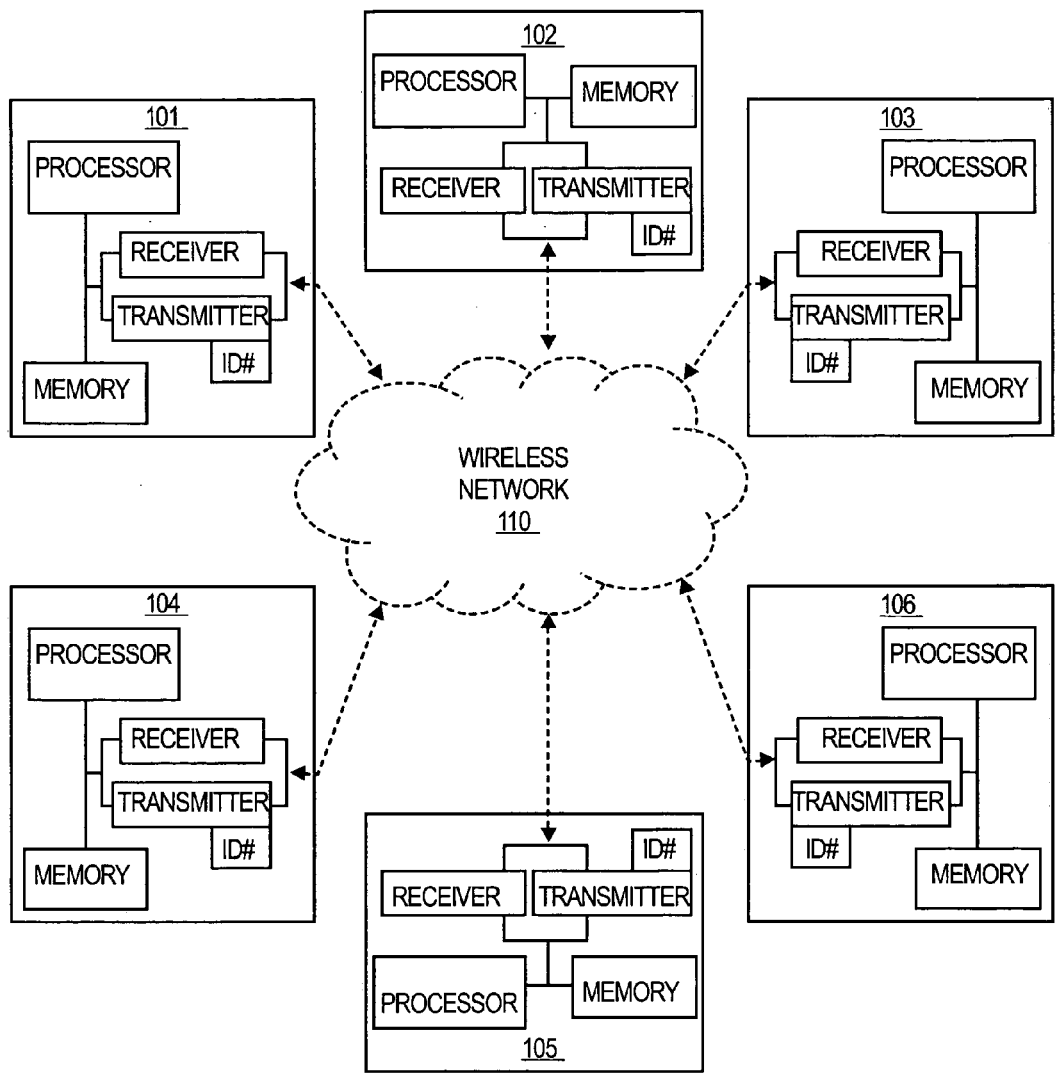
FIG. 1 is a wireless network coupling various electronic devices in accordance with an embodiment of the present invention.

FIG. 1 is a wireless network coupling various electronic devices, 101-106, in accordance with an embodiment of the present invention. Each electronic device includes a processor coupled to memory, a wireless communication receiver, and a wireless communication transmitter. In accordance with an embodiment of the present invention, the processor may be a general purpose processor or any other type of data processor such as a digital signal processor (DSP) or microcontroller. The memory of a electronic device may include one or more volatile and/or non-volatile storage devices. In accordance with one embodiment of the present invention, software is stored in the memory region that, when executed by the electronic device, causes the electronic device to implement a method of the present invention.

The electronic devices, 101-106 of FIG. 1, may be any type of electronic device. Note that the electronic devices may not all be of the same type. For example, electronic devices 101-103 may be mobile systems while electronic device 104 is a PDA, device 105 is a server or workstation, and device 106 is a cellular phone.

Each of devices 101-106 of FIG. 1 is coupled to one another via wireless network 110. Wireless network 110 may be any type of wireless communication protocol. Although wireless network 110 is shown in FIG. 1 supporting six electronic devices, a wireless network in accordance with an alternate embodiment of the present invention may support any number of electronic devices.

For one embodiment of the present invention, the wireless protocol implemented by wireless network 110 is a protocol in which each of electronic devices 101-106 coupled to the wireless network automatically makes each other system coupled to the network aware of its presence. For example, for one embodiment of the present invention, the wireless communication protocol implemented by wireless network 110 may be the Bluetooth* protocol described in the Bluetooth Specification, Version 1.0A, released Jul. 24, 1999. For another embodiment, the wireless communication protocol may be the HomeRF* protocol described in the Shared Wireless Access Protocol (SWAP) Specification 1.0, released Jan. 5, 1999. Other communication protocols may be used, however.

(*Trademarks and brands are the property of their respective owners.)

Figure 2:
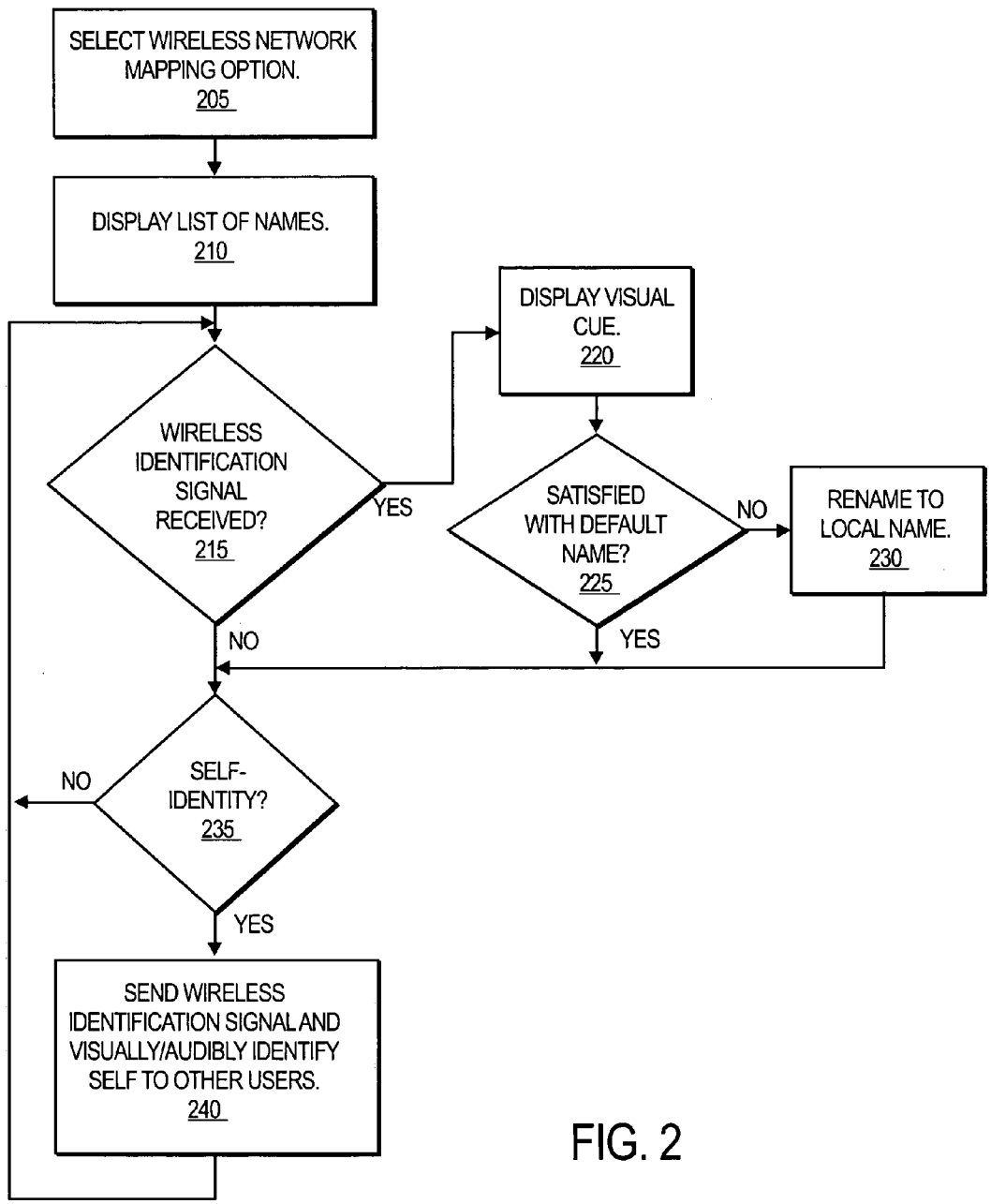
FIG. 2 is a flow chart showing a method of the present invention.

FIG. 2 is a flow chart showing a method of the present invention. At step 205, a first user of an electronic device of the plurality of electronic devices 101-106 of FIG. 1 selects a wireless network mapping option on the first user's electronic device. This option may be directly selected from a menu or icon on the screen of the first user's electronic device, or by appropriate key strokes. Alternatively, this option may be indirectly selected by the first user by selecting a function that might use information related to a wireless network map, such as a file transfer function.

At step 210, a list of names is displayed on the display screen of the first user's electronic device. Each name in the list is associated with an active electronic device coupled to the wireless network to which the first user's electronic device is coupled. An example of such a list is provided in FIG. 3a.

Figure 3A:
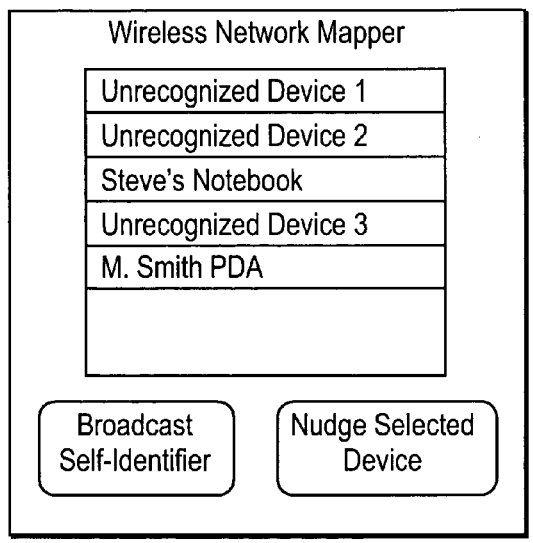
FIGS. 3*a*-3*c* shows some menu options presented to a user in accordance with an embodiment of the present invention.

FIG. 3a shows five electronic devices coupled to a wireless network. This is the type of list that might be seen by a user on the display screen of, for example, electronic device 101 of FIG. 1. For this example, each of the five names in the list of FIG. 3a corresponds to one of the other five electronic devices, 101-106, coupled to wireless network 110 of FIG. 1. The names in this list may initially be the default names associated with each electronic device.

Each electronic device is assigned a unique identification number (labeled "ID#" in FIG. 1) that the electronic device uses to identify itself to other electronic devices coupled to a wireless network in a wireless communication protocol. These unique identification numbers facilitate the wireless transmission of data between the electronic devices. Unfortunately, because users prefer to refer to electronic devices by name rather than number, these unique identification numbers are inconvenient for use in identifying electronic devices to users.

As an alternative, a user may set the default name associated with their electronic device to be something more intuitive, such as "Joe Smith's Computer." The default names and unique identification numbers of two electronic devices are wirelessly transmitted to each other when the two devices are in communication with each other. The default names are used by the users to refer to each other's device. These default names are translated into unique identification numbers and are used by the electronic devices to implement the wireless communication protocol to accomplish the tasks requested by the users.

One problem that may be encountered with this scheme is that the default name associated with a first electronic device on a wireless network may be untranslatable by a second electronic device on the wireless network. This may occur if, for example, a user sets the default name for the first device in a language different than the language used by another user on the second device. If the two languages do not translate well between each other (e.g. if entirely different characters are used in one language versus the other), then the default name sent from the first electronic device may be undecipherable by the second device, even though the devices themselves understand each other's unique identification numbers.

Referring again to FIG. 3a, the default names of only two electronic devices on wireless network 110 are recognized by electronic device 101 (continuing the example in which the display screen of electronic device 101 of FIG. 1 displays the wireless network mapping menu of FIG. 3a). Only "Steve's Notebook" and "M. Smith PDA" are recognized. Three default names of the five other electronic devices coupled to network 110 are unrecognizable, and so may be assigned generic default names in the native language used by electronic device 101. As shown in FIG. 3a, the default names automatically assigned to the three unrecognized devices are "Unrecognized Device 1", "Unrecognized Device 2", and "Unrecognized Device 3."

Referring again to FIG. 2, it is determined at step 215 if a wireless identification signal is received. If a wireless identification signal is received by electronic device 101, then at step 220 a visual cue is provided to the user of device 101. This visual cue identifies which name in the list of electronic devices is associated with the electronic device sending the wireless identification signal. The visual cue may include flashing the associated name, changing its color, encircling the name, placing a marker beside the name, or any other cue that indicates to the user that a wireless identification signal has been sent by an electronic device associated with the particular name. In accordance with the embodiment of the present invention of FIG. 3b, an identification signal is received from Unrecognized Device 2, resulting in the highlighting of this name in the list.

At step 225 of FIG. 2, the user determines if the user is satisfied with the default name assigned to the device that sends the identification signal, "Unrecognized Device 2." If the user is satisfied with this default name, the process continues to step 235. If the user is unsatisfied with this name, the process continues to step 230 and the user is provided with an option to rename the default name to a new local name. A local name is a name assigned by a user of a first electronic device to refer to another electronic device. This local name may be a name determined by the user to be more intuitive than the default name.

Figure 3B:
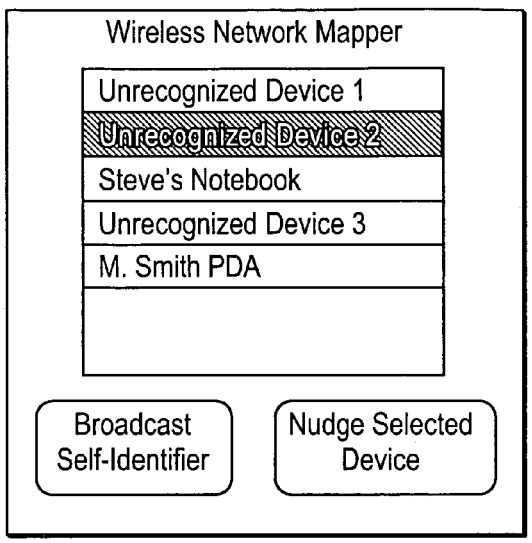

For example, assume the wireless identification signal is received from electronic device 102 of FIG. 1. The name associated with this electronic device is "Unrecognized Device 2" on electronic device 101, as shown in FIG. 3b. The user of device 102, when sending the wireless identification signal, also identifies himself or herself to the user of device 101. The user of device 101 can then mentally associate "Unrecognized Device 2" with electronic device 102 to facilitate the exchange of data with the user of device 102 more securely and confidently. For simplicity, however, the user of device 101 may wish to rename "Unrecognized Device 2" to the name of the user of device 102 to make the association more intuitive.

Figure 3C:
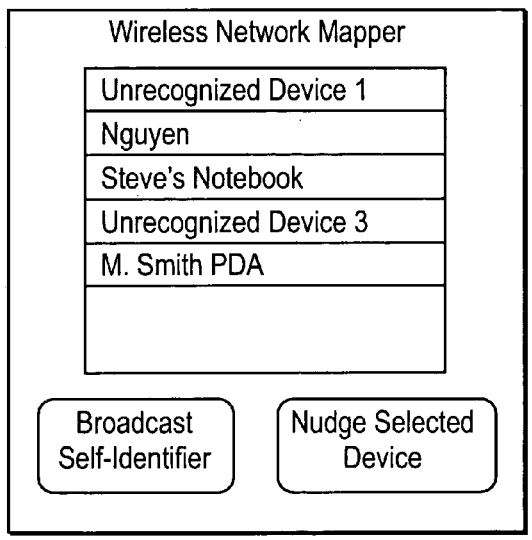

This is what has been done as shown in FIG. 3c. The user of electronic device 101 has renamed "Unrecognized Device 2" to "Nguyen," the hypothetical name of the user of device 102. Renaming of the other default names of unrecognized devices may proceed in this manner until the names associated with electronic devices 102-106 are more intuitive to the user of electronic device 101. This will greatly aid in the exchanging of files among the users of electronic devices 101-106, as described below.

At step 235 of FIG. 2, the user is presented with an option to send their own wireless identification signal from their electronic device to one or more other electronic devices coupled to wireless network 110. In the wireless network mapping example of FIGS. 3a-b, the user of electronic device 101 may send a wireless identification signal to the other electronic devices by selecting the "Broadcast Self-Identifier" option. Alternatively, the user may send a wireless identification signal to select electronic devices by, for example, selecting specific electronic devices from a list.

At step 240 of FIG. 2, the user sends a wireless identification signal and contemporaneously identifies himself or herself to the users of electronic devices 102-106 (by, e.g., raising his or her hand and/or announcing themselves). In response to receiving the wireless identification signal from electronic device 101, a visual cue is provided to the users of electronic devices 102-106 to identify the name associated with electronic device 101 in their respective network mapping programs. The users of devices 102-106 may then decide whether or not to rename the default name associated with electronic device 101 to a local name that is more intuitive to the respective user.

After each user has appropriately renamed (if necessary) the names associated with the other electronic devices coupled to wireless network 110 of FIG. 1, data may be exchanged more easily and securely. For example, suppose the user of electronic device 101 wishes to send a file to the user of device 102. After the device renaming protocol described above has taken place, the user of device 101 knows that the local name "Nguyen" is associated with device 102. When the user of device 101 selects a file and an export option, a menu appears requesting the user to select a target device (or devices) from the list of names associated with devices 102-106 coupled to wireless network 110. The user then simply selects "Nguyen" from the list, and the file is sent to electronic device 102.

Figure 4:
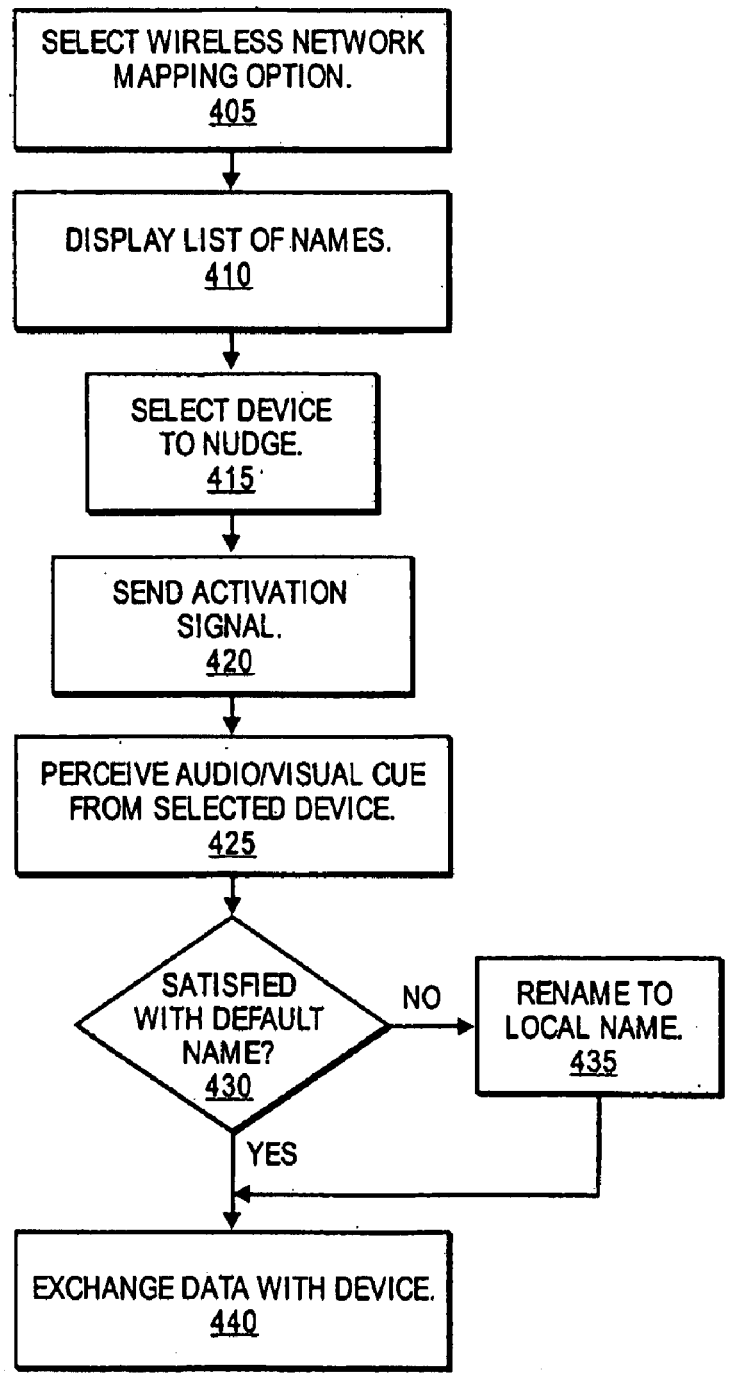
FIG. 4 is a flow chart showing another method of the present invention.

FIG. 4 is a flow chart showing another method of the present invention. This embodiment of the present invention addresses a problem in which a user may need to map "unmanned" electronic devices coupled to a wireless network. In other words, the embodiment of FIG. 4 assumes that the electronic devices may not have users to initiate the sending of a wireless identification signal contemporaneously with a visual or audio identification of themselves. This might be the case when the electronic devices coupled to the wireless network include devices such as printers, modems, or LAN access ports. Although each of these electronic devices may appear in a wireless network mapping list, there may be no indication as to which default name is associated with which electronic device.

Figure 5:
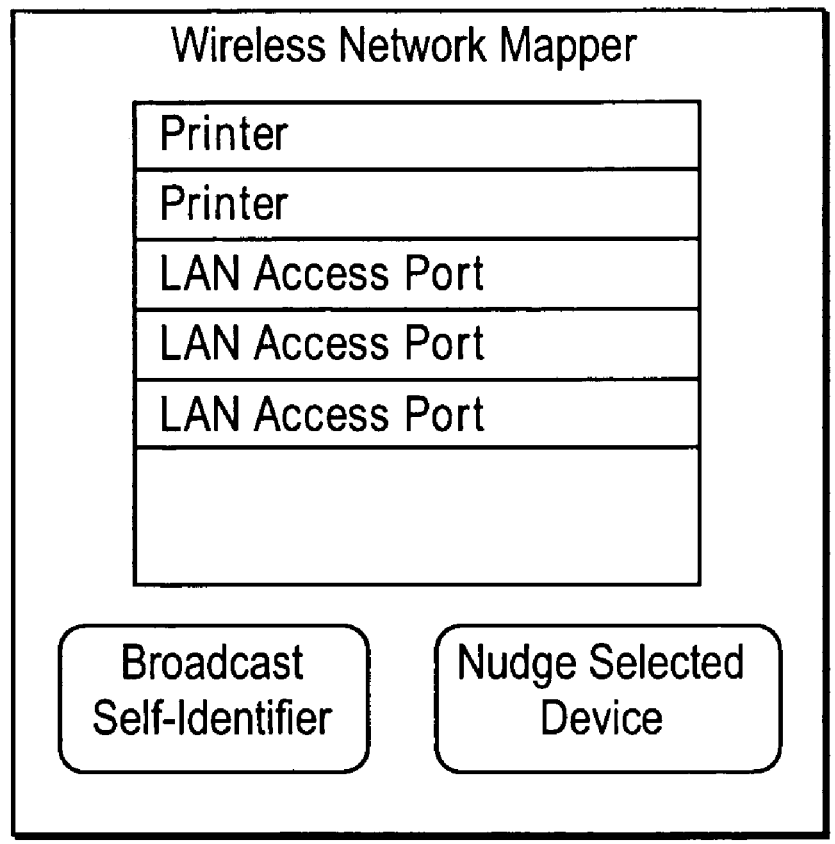
FIG. 5 shows some menu options presented to a user in accordance with another embodiment of the present invention.

At step 405 of FIG. 4, a user selects a wireless network mapping option from a menu on their electronic device. In response, at step 410, a list of names associated with the electronic devices coupled to the wireless network appears on the user's display screen. An example of this network mapping list is provided in FIG. 5.

At step 415 of FIG. 4, the user selects which of the devices in the list a wireless activation signal is to be sent. An activation signal is a signal that causes an electronic device to identify itself using either an audio cue, a visual cue, or both. At step 420 the activation signal is sent in response to the user selecting the "Nudge Selected Device" option in FIG. 5. For an alternate embodiment of the present invention, activation signals can be sent to multiple electronic devices by selecting more than one name from the network mapping list.

At step 425, the electronic device associated with the name selected by the user provides an audio or visual cue in response to receiving the activation signal. This audio or visual cue may be a beep emanating from the electronic device, or the activation of a visible light located on the device. The user perceives this cue and, at step 430, determines whether or not to rename the default name associated with the activated electronic device. If unsatisfied, the user may, at step 435, rename the name associated with the electronic device to a new local name that may be more intuitive for the user.

Finally, at step 440, data may be exchanged between the user's electronic device and one or more other devices coupled to the wireless network. This exchange may take place using a file export (or file import) function in the manner described above.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

I claim:

1. A method of mapping electronic devices coupled to a wireless network comprising:

displaying a first list of names on a display screen of a first electronic device coupled to the wireless network, each name in the first list associated with an active electronic device coupled to the wireless network;

displaying a visual cue on the display screen of a first electronic device in response to receiving a first wireless identification signal from a second electronic device, the cue identifying a default name associated with the second electronic device in the first list of names of electronic devices;

broadcasting a second wireless identification signal identifying the second electronic device or its user, the second wireless identification signal directly perceivable by the senses of the user of the first electronic device, the second wireless identification signal sent contemporaneously with the first wireless identification signal; and providing an option on the first electronic device to rename the default name associated with the second electronic device to a local name.

2. The method of claim 1, further comprising:

providing an option on the first electronic device to broadcast a third wireless identification signal from the first electronic device, the third identification signal including a first default name assigned by a user of the first electronic device;

displaying a visual cue on the display screen of the second electronic device in response to the second electronic device unable to translate the first default name, the visual cue identifying a second default name associated with the first electronic device in a second list of names of a plurality of electronic devices coupled to the wireless network.

3. The method of claim 2, further comprising:

providing an option on the first electronic device to broadcast a wireless activation signal to a user-selected electronic device from the first list of names of electronic devices;

sending an audio or visual cue from the user-selected electronic device in response to the activation signal, the audio or visual cue directly perceivable by the senses of the user of the first electronic device.

4. The method of claim 1, further comprising:

providing an option on the first electronic device to broadcast a wireless activation signal to multiple user-selected electronic devices from the first list of names of devices;

sending an audio or visual cue from the user-selected electronic device in response to the activation signal, the audio or visual cue directly perceivable by the senses of the user of the first electronic device.

5. The method of claim 1, further comprising providing a data exchange option on the first electronic device to send a file to the second electronic device, the data exchange option identifying the second electronic device by the local name.

6. The method of claim 4, wherein displaying the first list of names is done in response to a user of the first electronic device selecting a wireless network mapping menu option.

7. A computer system programmed to implement the method of claim 1.

8. A computer-readable medium comprising a plurality of instructions readable therefrom, the instructions, when executed by a first electronic device, cause the first electronic device to perform operations comprising:
  displaying a first list of names on a display screen of a first electronic device coupled to the wireless network, each name in the first list associated with an active electronic device coupled to the wireless network;
  displaying a visual cue on the display screen of a first electronic device in response to receiving a first wireless identification signal from a second electronic device, the cue identifying a default name associated with the second electronic device in the first list of names of electronic devices;
  broadcasting a second wireless identification signal identifying the second electronic device or its user, the second wireless identification signal directly perceivable by the senses of the user of the first electronic device, the second wireless identification signal sent contemporaneously with the first wireless identification signal; and
  providing an option on the first electronic device to rename the default name associated with the second electronic device to a local name.

9. The medium of claim 8, wherein the operations further comprise:
  providing an option to broadcast a wireless identification signal from the first electronic device to multiple electronic devices, including the second electronic device, the identification signal including a first default name assigned by a user of the first electronic device;
  displaying a visual cue on the display screen of the second device in response to the second electronic device unable to translate the first default name, the cue identifying a second default name associated with the first electronic device in a second list of names of a plurality of electronic devices coupled to the wireless network.

10. The medium of claim 9, wherein the operations further comprise providing an option to broadcast a wireless activation signal to multiple user-selected electronic devices from the first list of names of electronic devices, the activation signal to cause the user-selected electronic devices to identify themselves using an audio or visual cue.

11. The medium of claim 8, wherein the operations further comprise providing an option to broadcast a wireless activation signal to multiple user-selected electronic devices from the first list of names of electronic devices, the activation signal to cause the user-selected electronic devices to identify themselves using an audio or visual cue.

12. The medium of claim 8, wherein the operations further comprise providing a data exchange option on the first electronic device to send a file to the second electronic device, the data exchange option identifying the second electronic device by the local name.

13. The medium of claim 8, wherein displaying the first list of names is done in response to a user of the first electronic device selecting a wireless network mapping menu option.

14. The method of claim 1 further comprising providing an option on the first electronic device to rename the default name associated with the second electronic device to a local name.

* * * * *